United States Patent [19]

Laughner

[11] Patent Number: 5,087,663

[45] Date of Patent: Feb. 11, 1992

[54] MOLDING COMPOSITIONS WITH METHYL (METH)ACRYLATE-BUTADIENE-STYRENE GRAFT COPOLYMERS

[75] Inventor: Michael K. Laughner, Lake Jackson, Tex.

[73] Assignee: The Dow Chemical Company, Midland, Mich.

[21] Appl. No.: 428,284

[22] Filed: Oct. 27, 1989

Related U.S. Application Data

[63] Continuation-in-part of Ser. No. 320,663, Mar. 8, 1989, abandoned.

[51] Int. Cl.$^5$ ............................................. C08L 69/00
[52] U.S. Cl. ..................................... 525/67; 264/322; 264/523; 264/540; 264/544
[58] Field of Search ................. 525/67, 146, 148; 264/322, 523, 540, 544

[56] References Cited

U.S. PATENT DOCUMENTS

| | | | |
|---|---|---|---|
| 3,852,393 | 12/1974 | Furukawa | 524/511 |
| 4,474,999 | 10/1984 | Mark et al. | 568/720 |
| 4,526,926 | 7/1985 | Weber | 525/146 |
| 4,617,345 | 10/1986 | Sederel | 525/67 |
| 4,652,602 | 3/1987 | Liu | 524/449 |
| 4,677,162 | 6/1987 | Grigo et al. | 525/67 |

FOREIGN PATENT DOCUMENTS 5859258  10/1981  Japan.

OTHER PUBLICATIONS

S. S. Schwartz and S. H. Goodman, Editors; "*Plastics Materials and Processes*"; Van Nostrand Reinhold (1982); pp. 527-540; 617-631; 632-650.

*Primary Examiner*—Melvyn I. Marquis
*Assistant Examiner*—David Buttner

[57] ABSTRACT

Carbonate polymers (PC) such as randomly branched carbonate polymers and blends thereof with linear carbonate polymers are blended with ABS polymers and MBS polymers. The ABS polymers have greater than 18% acrylonitrile and the MBS polymers have an outer polymer shell made from alkyl (meth)acrylates. This locates the MBS rubber modifier in the PC phase and the PC/ABS interphase so that higher melt elasticity is achieved and the compositions are therefore useful in blow molding and thermoforming applications.

8 Claims, 4 Drawing Sheets

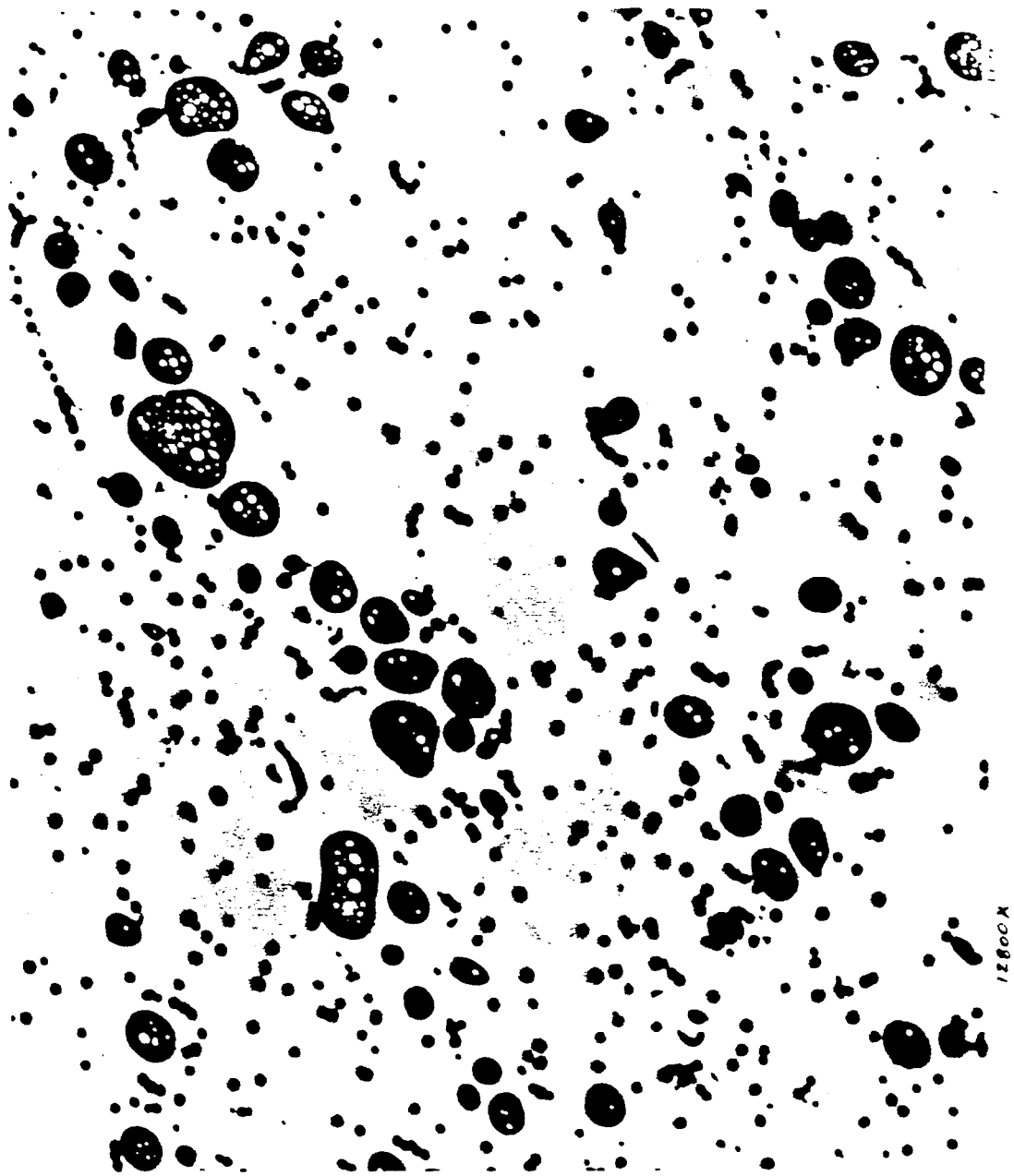

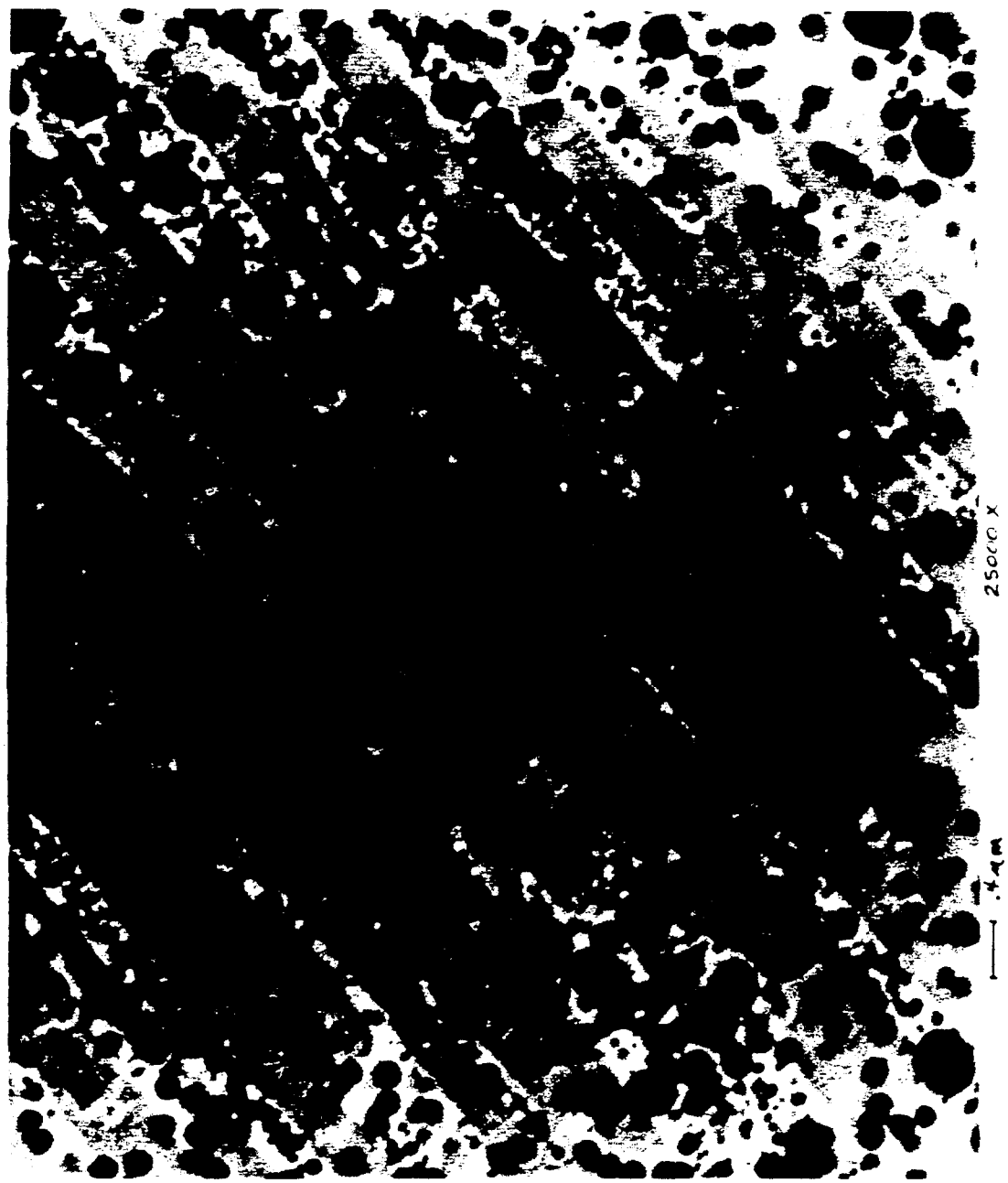

MOLDING COMPOSITIONS WITH METHYL (METH)ACRYLATE-BUTADIENE-STYRENE GRAFT COPOLYMERS

CROSS-REFERENCE TO RELATED APPLICATIONS

This application is a continuation-in-part of Ser. No. 320,663 filed Mar. 8, 1989 now abandoned.

BACKGROUND OF THE INVENTION

This invention relates to thermoplastic resin compositions and methods of using them and more particularly relates to improved blow moldable or thermoformable polycarbonate/ABS compositions.

More specifically, this invention relates to blow molding compositions comprising a blend of carbonate polymers with (1) graft copolymers of butadiene or a butadiene-vinyl aromatic hydrocarbon copolymer with a mixture of acrylonitrile and a vinyl aromatic hydrocarbon containing less than 40% rubber and (2) a melt strength enhancing agent having a Tg less than 0° C. and greater than 40% rubber made from a core/shell graft copolymers of butadiene or butadiene-vinyl aromatic hydrocarbon or butadiene-vinyl aromatic hydrocarbon-alkyl acrylate with optionally a second phase of vinyl aromatic hydrocarbon and a outer shell of alkyl (meth)acrylate.

Although polycarbonate/ABS compositions have been found to be thermoplastically moldable under a broad range of injection molding conditions, only select polycarbonate blends are suitable for blow molding. This is due to the unique requirement of thermoplastic resin for blow molding operations.

In the conventional blow molding operation, as taught in U.S. Pat. No. 4,652,602 and U.S. Pat. No. 4,474,999, a tube or parison of the heat softened thermoplastic blend may be extruded vertically downward into a mold. The extrudate is then pressed unto the mold surfaces with a pressurized gas flow (usually air or inert gas), shaping the heat softened resin. As appreciated by those skilled in the art, the successful molding of a given thermoplastic resin is dependent upon a number of factors, including the characteristics and physical properties of the heat softened resin. The length and diameter of the tube and the quantity of material forming the tube are limiting factors in determining the size and wall thickness of the object that can be molded by this process. The fluidity of the melt obtained from polycarbonate/ABS blends, or the lack of melt strength as well as the paucity of extrudate swelling, serve to limit PC/ABS resins in blow molding applications to relatively small, thin walled parts. The above factors alone are of considerable importance in the successful blow molding of any resin, particularly in regard to the molding of large articles.

It is known from Japanese patent 58/59258 that resin compositions with good weldline strength can be obtained from blends of linear polycarbonate resins, acrylonitrile-butadiene-styrene resins (ABS), and rubbery graft copolymer resins (MBS). However, this reference does not suggest the advantage of controlling rubber placement and in fact is attempting to modify the ABS phase to improve the weldline by utilizing MBS core/shell resins containing 30-50% rubber with styrene in the outer shell.

It is further known from U.S. Pat. No. 4,677,162 that a moldable blend of both linear or branched polycarbonate resins (PC), acrylonitrile-butadiene-styrene resins (ABS), and rubbery graft copolymers (MBS) is useful to form articles with good impact and low gloss. However, this reference utilizes only ABS resins with low AN content and does not suggest the advantage of controlling rubber placement by altering the solubility parameter and/or polarity of the ABS resin by varying the acrylonitrile content such that the addition of a second rubbery graft copolymer will be located at the PC interphase or in the PC phase.

SUMMARY OF THE INVENTION

The present invention is directed to a thermoplastic blend composition useful for blow molding or thermoforming comprising A) about 20 to about 95% by weight and preferably about 30 to about 90% by weight of a carbonate polymer selected from the group consisting of
   (i) randomly branched carbonate polymers,
   (ii) linear carbonate polymers, and
   (iii) blends of randomly branched carbonate polymers with linear carbonate polymers, B) about 5 to about 75% by weight and preferably about 10 to about 65% by weight of a graft copolymers of butadiene or a butadiene-vinyl aromatic hydrocarbon copolymer with a mixture of acrylonitrile and a vinyl aromatic hydrocarbon which contains greater than 18% by weight of acrylonitrile and less than 40% rubber and C) about 1 to about 20% by weight and preferably about 3 to about 12% by weight of a melt strength enhancing agent having a Tg less than 0° C. and greater than 40% rubber made from a core/shell graft copolymers of butadiene or butadiene-vinyl aromatic hydrocarbon or butadiene-vinyl aromatic hydrocarbonalkyl acrylate with optionally a second phase of vinyl aromatic hydrocarbon and a outer shell of alkyl (meth)acrylate.

The preferred compositions contain about 50 to about 80% by weight of a blend of 50% by weight randomly branched carbonate polymers with 50% by weight linear carbonate polymers, about 10 to about 65% by weight of a graft copolymers of butadiene or a butadiene-vinyl aromatic hydrocarbon copolymer with a mixture of acrylonitrile and a vinyl aromatic hydrocarbon which contains greater than 18% by weight of acrylonitrile and less than 40% rubber and about 3 to about 9% by weight of a melt strength enhancing agent having a Tg less than 0° C. and greater than 40% rubber made from a core/shell graft copolymers of butadiene or butadiene-vinyl aromatic hydrocarbon or butadiene-vinyl aromatic hydrocarbon-alkyl acrylate with optionally a second phase of vinyl aromatic hydrocarbon and a outer shell of alkyl (meth)acrylate.

The articles produced and/or molded by using the compositions of the invention are useful as automotive components, bottles, tool housings and the like.

BRIEF DESCRIPTION OF THE FIGURES

FIGS. 1-4 are transmission electron microscope (TEM) photographs of the resinous compositions disclosed herein. FIG. 1 is a TEM photograph of control 1 showing that the PC/ABS 213/MBS blend (16% acrylonitrile by wt.) has the MBS rubber (small black spheres) totally in the light gray SAN phase. FIG. 2 is a TEM photograph of Example 1 showing that the PC/ABS X21/MBS blend (21% acrylonitrile by wt.)

has more of the MBS rubber at the dark gray PC interphase or polycarbonate phase. FIG. 3 is a TEM photograph of Example 2 showing that the PC/ABS Y23/MBS blend (23% acrylonitrile by wt.) has MBS rubber in the darker gray PC interphase and PC phase. FIG. 4 is a TEM photograph of Example 8 showing that the PC/emulsion ABS /MBS blend (27% acrylonitrile by wt.) has the MBS rubber in the darker gray PC phase. The photographs of the examples show the location of the small particles of rubbery impact modifier in both the polycarbonate and the ABS resin interphases and this location of the rubber particles in both phases or interphases not only gives improved interfacial bonding but also results in higher melt strength, elastic modulus and higher zero shear viscosity. These are properties which are desirable and/or useful in blow molding of large parts since high R* values (a measure of melt elasticity and viscosity) are needed for the blow molding of parisons weighing 4 pounds or more. The ability of control the placement of rubber, such that rubber now resides in each phase or interphase of a multi-phase polymer blend, is critical to increase the melt strength and elastic modulus of compositions used for large part blow molding applications.

DETAILED DESCRIPTION OF THE INVENTION

The carbonate polymers employed in the present invention are advantageously aromatic carbonate polymers such as the trityl diol carbonates described in U.S. Pat. Nos. 3,036,036; 3,036,037; 3,036,038 and 3,036,039; polycarbonates of bis(arhydroxyphenyl)-alkylidenes (often called bisphenol-A type diols) including their aromatically and aliphatically substituted derivatives such as disclosed in U.S. Pat. Nos. 2,999,835; 3,038,365 and 3,334,154; and carbonate polymers derived from other aromatic diols such as described in U.S. Pat. No. 3,169,121.

It is understood, of course, that the polycarbonate may be derived from (1) two or more different dihydric phenols or (2) a dihydric phenol and a glycol or a hydroxy- or acid-terminated polyester or a dibasic acid in the event a carbonate copolymer or interpolymer rather than a homopolymer is desired. Also suitable for the practice of this invention are blends of any one of the above carbonate polymers. Also included in the term carbonate polymer are the ester/carbonate copolymers of the types described in U.S. Pat. Nos. 3,169,121; 4,105,633; 4,156,069; 4,225,556; 4,260,731; 4,287,787; 4,330,662; 4,355,150; 4,360,656; 4,374,973; and 4,388,455. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

The branched chain polycarbonates used in this invention are prepared by reacting a dihydric phenol with phosgene in the presence of a trihydric and/or tetrahydric phenol. U.S. Pat. No. 3,544,514 discloses the process details and this patent is incorporated herein by reference.

Blow moldable resins and their desired properties are taught in U.S. Pat. Nos. 4,652,602 and 4,474,999 which are incorporated herein by reference. U.S. Pat. No. 4,652,602 is particularly pertinent since it gives a definition of R* which is a measure of blow moldability.

The grafted copolymers of the present invention are generally characterized as having a core-matrix or core-shell structure, typically prepared by emulsion, suspension, or mass polymerization. The elastomeric portion of such composite is usually dispersed as discrete particles in a matrix made up of the thermoplastic portion. The various particles are grafted to the thermoplastic matrix, which allows the rubber properties of the elastomeric portion, or component, to contribute to the toughness and melt strength of the composite. Grafting between the elastomeric component and the thermoplastic matrix allows the shear-yielding tendency of the rubber—the elastomeric phase—to assist in the dissipation of the energy of an impact blow, reducing the likelihood of a stress fracture. This grafting also provides higher elasticity and strength in the melt stage.

An acrylonitrile-butadiene-styrene resin (ABS) is typically formed by the grafting of a styreneacrylonitrile (SAN) copolymer onto a polybutadiene substrate latex. The polybutadiene forms a rubber, the elastomeric component, which is dispersed as a discrete phase in a thermoplastic component formed by the SAN. The rubber content of the rubber-modified styrenic thermoplastic resin used in this invention is not more than 40% by weight. This structural aspect of ABS, the dispersion of a rubber in a compatible thermoplastic phase, together with the flexibility of varying the molecular weight of the respective components, the degree of grafting, and rubber particle size and morphology is just as important as the precise monomer content. The composite can be manufactured from nothing other than acrylonitrile, butadiene and styrene, or other monomers can be substituted or mixed in with them. Although alteration of the monomer mix yields a variation in the properties of the composite, usually it does not, nor is intended to, cause a variation in the fundamental substrate-graft-matrix structure which is characteristic of a rubber-modified styrenic thermoplastic resin such as ABS. However, the monomer mix does influence the solubility parameter of the thermoplastic SAN phase and as shown in this invention can be used to direct or place a rubber component in a non-styrenic polymer when the three are blended. The elastomeric/thermoplastic ABS composite used in this invention can be made from any of the various monomers providing the acrylonitrile concentration is greater than 18% by weight.

The ABS used this invention can be made by any of the various methods described in greater detail in Childers, U.S. Pat. No. 2,820,773 (U.S. Rubber), Calvert, U.S. Pat. No. 3,238,275 (Borg Warner), Carrock, U.S. Pat. No. 3,515,692 (Dart), Ackerman, U.S. Pat. No. 4,151,128 (Mobil), Kruse, U.S. Pat. No. 4,187,260 (Monsanto), Simon, U.S. Pat. No. 4,252,911 (Monsanto) and Weber, U.S. Pat. No. 4,526,926 (Dow). Each of these patents is hereby incorporated herein by reference in their entirety.

The melt strength enhancing agent used in this invention is an methylmethacrylate-butadiene-styrene resin (MBS) or core/shell rubber having a Tg less than 0° C. and a rubber content greater than 40%. These are generally made by polymerizing a conjugated diene, or by copolymerizing a conjugated diene with a mono-olefin or polar vinyl compound, such as styrene, acrylonitrile or methyl methacrylate. The substrate latex is typically made up of about 45–85% conjugated diene and about 15-55% of the mono-olefin or polar vinyl compound. A mixture of monomers is graft polymerized to the substrate latex. A variety of monomers may be used for this grafting purpose, of which the following are exemplary: vinyl compounds such as vinyl toluene, alpha-methyl styrene, halogenated styrene, naphthalene, acrylonitrile, methacrylonitrile or alpha-halogenated acrylonitrile, or a $C_1$-$C_8$ alkyl acrylate such as methacrylate, ethylacrylate or hexyl acrylate, a $C_1$-$C_8$ alkyl methacrylate such as methyl methacrylate, ethyl methacrylate or hexyl methacrylate, an acrylic or methacrylic acid, or a mixture of two or more of the foregoing. The extent of grafting is sensitive to the substrate latex particle size, and particle size may be influenced by controlled coagulation techniques among other methods. When the graft level is allowed to reach an excessively high level, the melt strength effect of the relative substrate latex content is reduced.

The grafting monomers may be added to the reaction mixture simultaneously or in sequence, and, when added in sequence, layers, shells or wart-like appendages can be built up around the substrate latex, or core. The monomers can be added in various ratios to each other although, when just two are used, they are frequently utilized in equal amounts. A typical weight ratio for an MBS rubber is about 60-80 parts by weight substrate latex, about 10-20 parts by weight first monomer and about 10-20 parts by weight second monomer. A preferred formulation of an MBS rubber is one having a core build up from about 71 parts of butadiene, about 3 parts of styrene, about 4 parts of methyl methacrylate and about 1 part of divinyl benzene; a second phase of about 11 parts of styrene; and a shell phase of about 11 parts of methyl methacrylate and about 0.1 part of 1,3-butylene glycol dimethacrylate, where the parts are by weight of the total composition. A product having substantially such content is available commercially from Rohm and Haas Company as Paraloid TM EXL 3607 coreshell polymer.

The MBS rubber and methods for making same, as described above, are discussed in greater detail in Saito, U.S. Pat. No. 3,287,443 (Kanegafuchi), Curfman, U.S. Pat. No. 3,657,391 (Borg-Warner) and Fromuth, U.S. Pat. No. 4,180,494 (Rohm and Haas), each of which is hereby incorporated herein by reference in their entirety.

The following examples and controls are presented to further illustrate the invention.

EXAMPLE 1

One thousand two hundred and forty parts by weight of a linear polycarbonate (Calibre TM 300-10, Dow Chemical Company) was mixed with 640 parts by weight acrylonitrile-styrene-butadiene copolymer (ABS X21), 2 parts by weight epoxy soybean oil Plas Chek TM 775 from the Ferro Company), 4 parts by weight Irganox TM 1076 antioxidant (from Ciba Geigy) and 120 parts by weight MBS rubber (Paraloid TM 3607 from the Rohm and Haas Company).

The mixture was uniformly blended together in a laboratory tumbler. The blend is introduced into a 30 mm Werner-Pfleiderer melt extruder, with heating set points of 270° C. The extrudate is pelletized and dried. The pellets are fed to a 70 ton Arburg injection molding machine to mold impact test bars of 12.6 cm × 1.25 cm and tensile bars of 16.3 cm × 1.3 cm with thickness of 3.175 mm.

The composition of each blend is given in Table 1 below. Each control and example composition was made by following the procedure for example 1. The moldings are subjected to tests to determine their blow moldability (R* value) and 10 mil notched Izod. The test results are given in Table 2 below.

These compositions may be useful in melt forming applications such as injection molding, blow molding or thermoforming applications and are not intended to be limited to only blow molding applications.

These compositions may also contain other ingredients such as UV and antioxidant stabilizers, fillers such as talc, reinforcement agents such as mica or glass fibers, ignition resistant additives, pigments, antistat agents, mold release additives, etc.

These formulations may also optionally include other rubber modified SAN copolymers where the rubber may be an alkyl acrylate or ethylene propylene diene terpolymer.

TABLE 1

| | PC/ABS Compositions | | | | | | |
|---|---|---|---|---|---|---|---|
| | Lin. PC (gms/wt %) | Bran. PC (gms/wt %) | ABS 213 (gms/wt %) | ABS X21 (gms/wt %) | ABS Y23 (gms/wt %) | Cyclolac TE-1000 (gms/wt %) | Para 3607 (gms/wt %) |
| Control 1 | 1240/62 | 0 | 640/32 | 0 | 0 | 0 | 120/6 |
| Example 1 | 1240/62 | 0 | 0 | 640/32 | 0 | 0 | 120/6 |
| Example 2 | 1240/62 | 0 | 0 | 0 | 640/32 | 0 | 120/6 |
| Control 2 | 0 | 1240/62 | 640/32 | 0 | 0 | 0 | 120/6 |
| Example 3 | 0 | 1240/62 | 0 | 0 | 640/32 | 0 | 120/6 |
| Example 4 | 620/31 | 620/31 | 0 | 0 | 640/32 | 0 | 120/6 |
| Example 5 | 930/46.5 | 310/15.5 | 0 | 640/32 | 0 | 0 | 120/6 |
| Example 6 | 620/31 | 620/31 | 0 | 640/32 | 0 | 0 | 120/6 |
| Example 7 | 310/15.5 | 930/46.5 | 0 | 640/32 | 0 | 0 | 120/6 |
| Control 3 | 1300/65 | 0 | 0 | 0 | 0 | 700/35 | 0 |
| Example 8 | 620/31 | 620/31 | 0 | 0 | 640/32 | 0 | 120/6 |

Notes:
(1) Lin. PC = linear polycarbonate 10 MFR
(2) Bran. PC = branched polycarbonate 3 MFR
(3) ABS 213 = acrylonitrile-styrene-butadiene graft copolymer from the Dow Chemical Company (16% acrylonitrile by wt.)
(4) ABS X21 = acrylonitrile-styrene-butadiene graft copolymer from Dow (21% acrylonitrile by wt.)
(5) ABS Y23 = acrylonitrile-styrene-butadiene graft copolymer from Dow (23% acrylonitrile by wt.)
(6) Para 3607 = Paraloid 3607 methylmethacrylate-styrene-butadiene core/shell graft copolymer from Rohm and Haas
(7) Cycloac TE-100 = emulsion ABS from Borg-Warner (25-29% acrylonitrile by wt.)
(8) All compositions contained 2 grams of epoxidized soybean oil and 4 grams of Irganox TM 1076 a high molecular weight, sterically hindered phenolic antioxidant from Ciba Geigy.

Control 1 is an example of a PC/ABS/MBS resin composition where the ABS contains only 16% AN in the rigid phase. Examples 2 and 3 show examples where the ABS portion contains 21% and 23% AN respectively. Table 2 shows that higher R* values and better low temperature perpendicular izod values are obtained over control 1 when the MBS rubber is located at the PC interface or in the PC phase. The location of the MBS rubber is dictated by the solubility parameter of the ABS resin which at higher AN levels drives the rubber to the PC phase. Examples 2 and 3 use only linear PC which has fairly low melt elasticity, thus directing a rubber into the PC phase can increase the melt elasticity required for improved blow molding resins.

The melt elasticity of a PC resin can be increased by using a branched polycarbonate. As expected, Control 2 shows a large increase in R* values by switching to a branched resin, however in doing so impact properties drop substantially. Example 3 shows that by directing the rubber to the PC phase, large improvements in R* and impact values are achieved. This rubber placement is dictated by the AN content of the second phase i.e., the ABS phase.

Examples 4, 5, 6, and 7 show that a blend of linear and branched polycarbonates give a good overall balance of high R* values and high impact values when the AN content of the ABS resin is greater than 20%. AN contents greater than 18% help direct the MBS to the PC phase which enhances the melt elasticity and impact of the overall blend.

The preferred ABS is mass produced, however, as seen in Control 3 emulsion produced ABS have lower R* values, but can be greatly enhanced with the addition of MBS as indicated in Example 8.

TABLE 2

PC/ABS Compositions

|  | R* | ⊥ Izod 23° C. | ⊥ Izod −29° C. | ∥ Izod 23° C. | ∥ Izod −29° C. | % AN by weight |
|---|---|---|---|---|---|---|
| Control 1 | 4.2 | 422 | 91 | 593 | 433 | 16 |
| Example 1 | 4.8 | 413 | 201 | 577 | 438 | 21 |
| Example 2 | 5.0 | 443 | 215 | 588 | 423 | 23 |
| Control 2 | 6.9 | 310 | 48 | 587 | 256 | 16 |
| Example 3 | 8.3 | 418 | 112 | 594 | 420 | 23 |
| Example 4 | 6.1 | 435 | 157 | 592 | 422 | 23 |
| Example 5 | 4.9 | 438 | 112 | 577 | 352 | 21 |
| Example 6 | 5.7 | 401 | 128 | 566 | 438 | 21 |
| Example 7 | 6.6 | 433 | 75 | 657 | 459 | 21 |
| Example 8 | 4.5 | 442 | 106 | 538 | 252 | 27 |
| Control 3 | 2.4 | 470 | 100 | 576 | 134 | 27 |

Note:
(1) Izod ⊥ and ∥ = Izod values (according to ASTM D-256 in joules/meter) perpendicular and parallel, respectively, to the direction of polymer flow taken at the given temperatures
(2) % AN = weight percent acrylonitrile in the ABS resin.
(3) R* = viscosity ratio describing the degree of melt elasticity.

EXAMPLE 9

The composition of Example 6 was blow molded using a Hartig blow molding machine with a 30 pound accumulator head having a 14 inch tooling diameter and a tooling angle of 30 degrees. This head employs a 3.5 inch extruder with a L:D ratio of 24:1 with a barrier screw running at 14 rpm and with set temperatures at 390° F. for each zone. Melt temperatures were measured at approximately 425° F. and mold temperatures were set a 170° F. A parison having a length of 52 inches was extruded weighing 10.2 pounds and it had a 16 inch layflat at both the top and bottom. Pinch bars to support the parison were not required because the high melt strength nor was pre-blow required because of reduced sag.

Excellent blow molded parts with uniform wall thickness were obtained. These were tested to give the following values.

| Instrumented Dart Impact | 586 in-lbs (at 73° F.) |
|---|---|
| (ASTM 3673) | 501 in-lbs (at −20° F.) |
| DTUL (264 psi) | 220° F. |
| Flexural Modulus | 329,000 psi |
| Tensile Strength | 7500 psi |
| Izod Impact | 10.6 ft-lbs (at 73° F.) |
| (10 mil notched) | 9.8 ft-lbs (at −20° F.) |

EXAMPLE 10

The procedure of Example 1 was repeated to make specimen bars using 40 parts by weight of a branched polycarbonate, 60 parts by weight of acrylonitrile-styrene-butadiene copolymer (ABS Y23) and 8 parts by weight MBS rubber (Paraloid TM 3607 from the Rohm and Haas Company). The predried tensile bars were suspended for 5 minutes by one end in a forced air oven at the approximate blow molding processing temperature of 190° C. for PC/ABS blends with increasing weights being suspended from the other end. In example 10, the maximum weight added in grams without any sagging is reported in Table 3 as 25 grams (the maximum support weight). This is a measure of the melt strength of the blend at the approximate blow molding processing temperature.

Examples 11–13 and controls 4 and 5 were prepared and tested in a similar manner to example 10 and the results are set forth in Table 3.

TABLE 3

PC/ABS Compositions

|  | Lin. PC (gms) | Bran. PC (gms) | ABS Y23 (gms) | B-11 (gms) | Para 3607 (gms) | Max. Support Wt. (gms) |
|---|---|---|---|---|---|---|
| Control 4 | 40 | 0 | 60 | 8.0 | 0 | 10 |
| Control 5 | 60 | 0 | 40 | 3.0 | 0 | 15 |
| Example 10 | 0 | 40 | 60 | 0 | 8.0 | 25 |
| Example 11 | 0 | 60 | 40 | 0 | 3.0 | 48 |
| Example 12 | 0 | 85 | 15 | 0 | 5.0 | 81 |
| Example 13 | 33 | 33 | 34 | 0 | 6.0 | 40 |

Notes:
(1) Lin. PC = linear polycarbonate 10 MFR.
(2) Bran. PC = branched polycarbonate 3 MFR.
(3) ABS Y23 = acrylonitrile-styrene-butadiene graft copolymer from Dow (23% acrylonitrile by wt.)
(4) Para 3607 = Paraloid 3607 methylmethacrylate-styrene-butadiene core/shell graft copolymer from Rohm and Haas
(5) B-11 = MBS resin from the Kanegafuchi Chemical Industry Controls 4 and 5 illustrate the invention set forth in Japanese patent 58-59258 and these controls show that the resins compositions of the patent have much lower melt strengths as compared to the examples of the present invention. Example 13 is a substantial duplicate of Example 4 and the high R* value of 6.1 shown in Table 2 for Example 4 correlates well with the maximum support weight of 40 grams shown in Table 3 for Example 13.

I claim:
1. A blow moldable or thermoforming composition comprising
   A) about 20 to about 95% by weight of a carbonate polymer selected from the group consisting of
      (i) randomly branched carbonate polymers, and

(ii) blends of randomly branched carbonate polymers with linear carbonate polymers, B) about 5 to about 75% by weight of a graft copolymers of butadiene or a butadiene-vinyl aromatic hydrocarbon copolymer with a mixture consisting of acrylonitrile and styrene which contains greater than 18% by weight of acrylonitrile and less than 40% rubber and C) about 1 to about 20% by weight of an MBS melt strength enhancing agent having a Tg less than 0° C. and greater than 40% rubber, which MBS is a core/shell graft copolymer having a core polymer of butadiene or butadiene-vinyl aromatic hydrocarbon or butadiene-vinyl aromatic hydrocarbon-alkyl acrylate with either a second phase polymer of vinyl aromatic hydrocarbon and an outer shell polymer consisting essentially of alkyl (meth)acrylate or an outer shell polymer consisting essentially of alkyl (meth)acrylate and vinyl aromatic hydrocarbon wherein at least part of the MBS copolymer is located in the carbonate polymer, component A), or in the interface between the carbonate polymer and the butadiene, acrylonitrile and styrene graft copolymer, component B).

2. A blow molded or thermoformed article prepared from the composition according to claim 1.

3. A blow moldable or thermoforming composition comprising

A) about 30 to about 90% by weight of randomly branched carbonate polymers,

B) about 10 to about 65% by weight of a graft copolymers of butadiene or a butadiene-vinyl aromatic hydrocarbon copolymer with a mixture consisting of acrylonitrile and styrene which contains greater than 18% by weight of acrylonitrile and less than 40% rubber and C) about 3 to about 12% by weight of an MBS melt strength enhancing agent having a Tg less than 0° C. and greater than 40% rubber, which MBS is a core/shell graft copolymer having a core polymer of butadiene or butadiene-vinyl aromatic hydrocarbon or butadiene-vinyl aromatic hydrocarbon-alkyl acrylate with either a second phase polymer of vinyl aromatic hydrocarbon and an outer shell polymer consisting essentially of alkyl (meth)acrylate or an outer shell polymer consisting essentially of alkyl (meth)acrylate and vinyl aromatic hydrocarbon wherein at least part of the MBS copolymer is located in the carbonate polymer, component A), or in the interface between the carbonate polymer and the butadiene, acrylonitrile and styrene graft copolymer, component B).

4. A blow moldable or thermoforming composition comprising

A) about 30 to about 90% by weight of a blend of randomly branched carbonate polymers with linear carbonate polymers, B) about 10 to about 65% by weight of a graft copolymers of butadiene or a butadiene-vinyl aromatic hydrocarbon copolymer with a mixture consisting of acrylonitrile and styrene which contains greater than 18% by weight of acrylonitrile and less than 40% rubber and C) about 3 about 12% by weight of an MBS melt strength enhancing agent having a Tg less than 0° C. and greater than 40% rubber, which MBS is a core/shell graft copolymer having a core polymer of butadiene or butadiene-vinyl aromatic hydrocarbon or butadiene-vinyl aromatic hydrocarbon-alkyl acrylate with either a second phase polymer of vinyl aromatic hydrocarbon and an outer shell polymer consisting essentially of alkyl (meth)acrylate or an outer shell polymer consisting essentially of alkyl (meth)acrylate and vinyl aromatic hydrocarbon wherein at least part of the MBS copolymer is located in the carbonate polymer, component A), or in the interface between the carbonate polymer and the butadiene, acrylonitrile and styrene graft copolymer, component B).

5. A blow moldable or thermoforming composition comprising

A) about 50 to about 80% by weight of a blend of 50% by weight randomly branched carbonate polymers with 50% by weight linear carbonate polymers, B) about 10 to about 65% by weight of a graft copolymers of butadiene or a butadiene-vinyl aromatic hydrocarbon copolymer with a mixture consisting of acrylonitrile and styrene which contains greater than 18% by weight of acrylonitrile and less than 40% rubber and C) about 3 to about 12% by weight of an MBS melt strength enhancing agent having a Tg less than 0° C. and greater than 40% rubber, which MBS is a core/shell graft copolymer having a core polymer of butadiene or butadiene-vinyl aromatic hydrocarbon or butadiene-vinyl aromatic hydrocarbon-alkyl acrylate with either a second phase polymer of vinyl aromatic hydrocarbon and an outer shell polymer consisting essentially of alkyl (meth)acrylate or an outer shell polymer consisting essentially of alkyl (meth)acrylate and vinyl aromatic hydrocarbon wherein at least part of the MBS copolymer is located in the carbonate polymer, component A), or in the interface between the carbonate polymer and the butadiene, acrylonitrile and styrene graft copolymer, component B).

6. A process for the preparation of a blow molded or thermoformed article comprising the steps of A) providing a composition having high melt viscosity and/or melt strength comprising I) about 20 to about 95% by weight of a carbonate polymer selected from the group consisting of (i) randomly branched carbonate polymers, and (ii) blends of randomly branched carbonate polymers with linear carbonate polymers II) about 5 to about 75% by weight of a graft copolymers of butadiene or a butadiene-vinyl aromatic hydrocarbon copolymer with a mixture consisting essentially of acrylonitrile and styrene which contains greater than 18% by weight of acrylonitrile and less than 40% rubber, III) about 1 to about 20% by weight of an MBS melt strength enhancing agent having a Tg less than 0° C. and greater than 40% rubber, which MBS is a core/shell graft copolymer having a core polymer of butadiene or butadiene-vinyl aromatic hydrocarbon or butadiene-vinyl aromatic hydrocarbon-alkyl acrylate with either a second phase polymer of vinyl aromatic hydrocarbon and an outer shell polymer consisting essentially of alkyl (meth)acrylate or an outer shell polymer consisting essentially of alkyl (meth)acrylate and vinyl aromatic hydrocarbon B) molding said composition to form an article.

7. The process as set forth in claim 6 wherein said carbonate composition comprises a blend of randomly branched carbonate polymers with linear carbonate polymers.

8. The process as set forth in claim 7 wherein said carbonate composition comprises about 50 to about 80% by weight of a blend of 50% by weight randomly branched carbonate polymers with 50% by weight linear carbonate polymers.

* * * * *

UNITED STATES PATENT AND TRADEMARK OFFICE
CERTIFICATE OF CORRECTION

PATENT NO. : 5,087,663

DATED : February 11, 1992

INVENTOR(S) : Michael K. Laughner

It is certified that error appears in the above-identified patent and that said Letters Patent is hereby corrected as shown below:

On the cover page, under "U.S. PATENT DOCUMENTS" please add the following references --3,852,394 12/1974 Kubota et al.
                                 4,847,153  7/1989  Grigo
                                 4,390,657  6/1983  Liu--.

Signed and Sealed this

Thirteenth Day of July, 1993

*Attest:*

MICHAEL K. KIRK

*Attesting Officer*      *Acting Commissioner of Patents and Trademarks*